Patented July 22, 1952

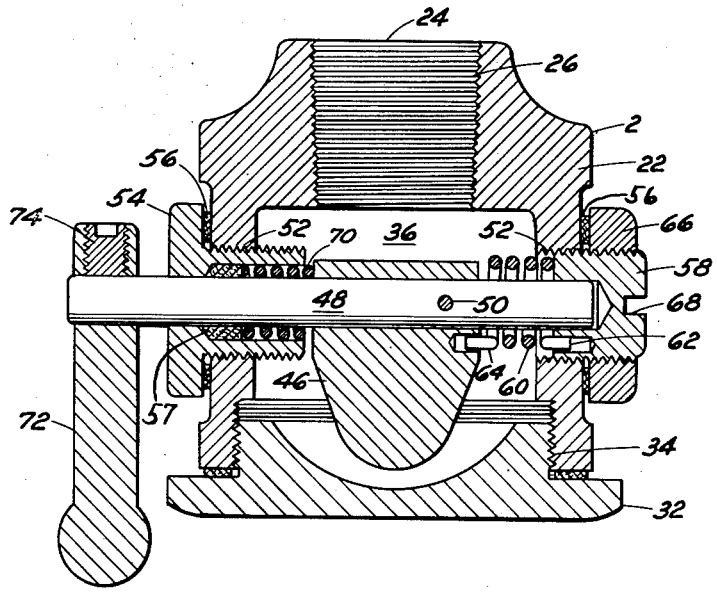
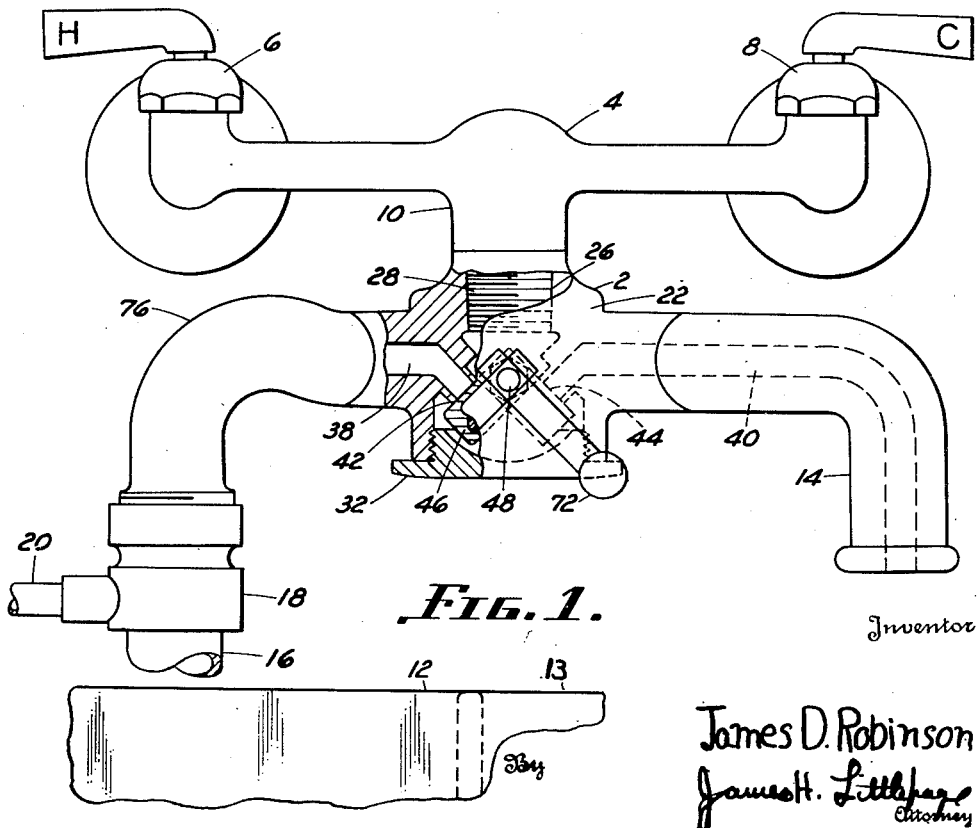

2,604,295

UNITED STATES PATENT OFFICE 2,604,295

AUTOMATIC CUTOFF VALVE FOR WATER DISTRIBUTION SYSTEMS

James D. Robinson, Memphis, Tenn.

Original application March 26, 1946, Serial No. 657,213, now Patent No. 2,549,012, dated April 17, 1951. Divided and this application March 22, 1950, Serial No. 151,061

1 Claim. (Cl. 251—118)

This invention relates to selector valves and, more particularly, to a two-way valve for switching the flow of water from one faucet to another. This application is a division of my co-pending application, Serial No. 657,213, filed March 26, 1946, now Patent No. 2,549,012 of April 17, 1951.

The primary object of the invention is to provide a valve which forms a part of a system for washing and sterilizing glasses, dishes, and the like utensils, particularly in restaurants, drug stores, and other public establishments where chlorinization is required. In the use of such systems, utensils are ordinarily first washed in a bath of soapy water and subsequently sterilized in another bath of water containing chlorine, the concentration of which is critical since any more than a minute quantity renders the utensil unsavory or even dangerous, whereas the use of less is unhealthy. In my prior Patent No. 2,181,069 I disclosed an injector adapted for connection in a pipe between a faucet and a tub for dosing the required amount of chlorine into water as it is drawn.

The present apparatus is for use in connection with chlorine injectors, but where hot and cold water spigots control water flowing through a common outlet, or swing faucet, disposed over a double tub sink. In prior installations of this type, it was necessary to provide a separate water supply utilizing a chlorine injector for the sterilizing tub, in which cases it was possible for the operator to swing the faucet to either tub and thus flow unchlorinated water to the sterilizing tub. One object of the present invention is to provide for the use of a common outlet for hot and cold water directable either to the wash or the sterilizing side of a double tub sink, and yet make it virtually impossible for the operator to flow unchlorinated water to the sterilizing side.

More particularly, it is intended to provide a selector having an inlet adapted for connection to the junction of the hot-and-cold water pipes of a double faucet, the selector having two outlets and pipes therefor branching, respectively, towards opposite sides of a two-tub sink, and a valve for closing one of the outlets while opening the other, whereby water may be switched, selectively, to either tub.

Additionally, it is proposed to adapt the selector for use with a chlorine doser in or connected to the outlet pipe leading to one of the tubs by a biasing mechanism which normally urges the valve to close the outlet to which the chlorinator is connected so that any drippage or slow leakage will be directed to the wash-water side of the sink, and not through the chlorine doser to the sterilizing side, whereby to prevent vestiges of chlorine in the doser from forming a high concentration in the drippings. Further to avoid this latter liability, it is an object to form a portion of the outlet branch leading directly from the valve as an elevated neck so that minute drippings past the valve cannot escape to the chlorinator.

A particularly important object is to arrange the valve and bias therefor so that, while the valve is normally biased to close the outlet leading to the chlorinator, it may be swung to the position in which it closes the outlet to the washwater outlet whilst opening the outlet to the chlorinator, and so that the force of the water passing through the valve will overcome the bias so as to hold the valve so long as the water flows therepast. When the water is shut off, the valve returns to its normal position. Incident to the broader features of the biasing mechanism, an object is to provide for the easy adjustment of the biasing spring and for quick and simple assembly and separation of the parts for cleaning.

These and other objects will be apparent from the following specification and drawing, in which:

Fig. 1 is a front elevation of the apparatus with a portion of the valve broken away; and Fig. 2 is a vertical section through the valve assembly.

Referring now to the drawing, in which like reference numerals denote similar elements, the adaptor indicated generally at 2 is arranged for connection at the junction 4 of the pipes leading from the hot and cold water spigots 6 and 8, respectively. Ordinarily, a swing faucet is connected to fitting 10 so that hot and cold water may be directed to either tub 12 or 13 of a double tub sink. In the example illustrated, it will be assumed that tub 13 is to be used for wash water while tub 12 is for sterilizing water.

As seen best in Fig. 1, the apparatus is provided with a wash water outlet 14 directed towards tub 13 and a sterilizing water outlet 16 directed towards tub 12, the outlet 16 leading through a chlorine injector 18 which may be of the type disclosed in my prior Patent No. 2,181,-069 connected by pipe 20 to a source of chlorine. The details of injector 20 are of no present moment other than that, as water flows therethrough, droplets of chlorine are licked up by the stream.

The selector valve includes a hollow casing 22 having an inlet 24 internally threaded at 26 for screw connection to an externally threaded sleeve 28 which depends in a fluid-tight manner from fitting 10. Casing 22 is closed at its lower end by a cap 32 threadedly engaged at 34 therein so as to enclose a chamber 36. Outlet passages 38 and 40 branch from chamber 36 respectively to the chlorine and wash water outlets, the inner ends of the outlet passages terminating in valve seats 42 and 44 arranged to be closed selectively by butterfly valve 46.

Valve 46 is bored near its upper end for fitting on a shaft 48 to which it is non-rotatably and non-slidably held by a pin 50. Threaded openings 52 formed in the side walls of casing 22 receive hollow bearing screws which rotatably support shaft 48. As seen in the left-hand portion of Fig. 2, bearing screw 54 is externally threaded, externally packed by washer 56 against the side wall of casing 22, and internally packed at 57 around the shaft 48 which passes therethrough while the other end of the shaft is held in bearing screw 58.

Valve 46 is normally biased to the position shown in full lines in Fig. 1 by a coil spring 60 having bent ends engaged in holes 62 and 64 respectively in screw 58 and valve shaft 48. As shown in the right-hand portion of Fig. 2, bearing screw 58 differs from screw 54 not only in that its hollow bore does not extend completely through, but also in that it carries a lock nut 66 for holding it in the position to which it may be adjusted by a screw driver applied to slot 68. By rotatably adjusting screw 58, the biasing torque applied by spring 60 against valve 46 may be varied. A coil spring 70 engaged around shaft 48 and between packing 57 and valve 46 counteracts axial thrust of spring 60.

On the outer end of shaft 48 a hand lever 72 is held in desired angular position by set screw 74 so that the valve may be manually swung to close against either seat 42 or 44. As shown at 76 in Fig. 1, the outlet 16 which includes chlorine injector 18 is bent upwardly to form a neck so that even if water drips from the spigots into casing 22, and even if valve 46 is not completely closed against seat 42, the drippings will pass out through outlet 40 rather than traverse neck 76.

In operation, spring 60 normally biases valve 46 against seat 42 so as to close off outlet 38 leading through chlorine injector 18 so that, upon opening either or both spigots 6 and 8, water will flow through wash water outlet 14 into tub 13. However, if, with the water turned on, it is desired to switch the flow of water to tub 12, lever 72 is manually swung counter-clockwise so as to lodge valve 46 against seat 44 as shown in dash-lines in Fig. 1. While the biasing torque applied by spring 60 tends to return valve 46 to its full-line position, the force of water passing through casing 22 and applied against the exposed face of the valve will overcome the bias of spring 50 and hold valve 46 closed against seat 44 until the flow of water is stopped or substantially curtailed, or until the lever is manually returned. As described above, the bias of spring 60 may be adjusted so as to predetermine the force of water required to hold valve 46 against seat 44. Optionally, the operator may swing valve 46 to its dash line position before turning on the water, and hold it there until a spigot is opened and the force of flowing water takes over to hold the valve in the selected position. The disposition of the major surface of the valve below shaft 48 results in a feathering action as the valve swings through its intermediate positions, and thereby prevents slamming of the valve. The valve motion through its intermediate positions is under the influence of the water flowing therepast and the bias of spring 60, both of which factors are relatively uniform. It is thus possible to obtain accurate settings by adjustment of bearing screw 58 so that the flow conditions under which valve 46 will swing from its dotted to full line positions can be predetermined.

The invention is not limited to the embodiment detailed above, but may be applied to equivalent and alternate structures within the scope of the following claim.

I claim:

A valve for distributing liquid in accordance with variations in the volume and rate of flow thereof above and below a predetermined value, comprising a casing enclosing a chamber having a centrally disposed inlet port and a pair of outlet ports angularly spaced from one another, valve seats surrounding the inner ends of said outlet ports, a substantially flat valve member pivoted in said casing for turning in opposite directions about an axis adjacent said inlet, said axis extending through said chamber, the inner faces of said valve seats lying in planes respectively diverging from said axis in a direction away from said inlet, said valve member having the major portion thereof lying within said chamber and on the side of said axis away from said inlet, said major portion being selectably closable against the valve seats surrounding the outlet ports upon swinging of said valve member about said axis, said valve member having a minor portion thereof on the side of said axis towards said inlet, said minor portion extending freely into said chamber in all positions of said valve member, manually operable means extending exteriorly of the valve for closing said valve member selectively against said seats so as alternately to dispose said member between either of said outlet ports and said chamber, whereby liquid under pressure flowing through said casing exerts a closing force on said member in the direction towards the seat against which it is closed proportional to the volume and rate of flow, and a spring operatively engaged between said casing and said member and exerting a biasing force thereagainst in a direction away from one of said seats and towards the other, whereby said biasing and closing forces cooperate with one another to maintain said member closed against one of said seats and oppose one another when said closure means is closed against the other of said seats so that, when said member is closed against said other seat and the fluid flow through the casing drops below said predetermined value, said biasing force overcomes said closing force and turns said member towards said one seat, the biasing force of said spring being less than the closing force of said liquid when the flow of the latter exceeds said predetermined value.

JAMES D. ROBINSON.

REFERENCES CITED

The following references are of record in the file of this patent:

UNITED STATES PATENTS

| Number | Name | Date |
| --- | --- | --- |
| 1,065,467 | Piel | June 24, 1913 |
| 1,081,744 | Hubbard | Dec. 16, 1913 |
| 1,139,352 | De Vite | May 11, 1915 |
| 1,448,941 | Powell | Mar. 20, 1923 |
| 1,546,995 | Petry | July 21, 1925 |
| 1,630,317 | Skenier | May 31, 1927 |